(12) United States Patent
Nascimento-Yoshida et al.

(10) Patent No.: US 10,521,531 B1
(45) Date of Patent: Dec. 31, 2019

(54) SYSTEM, METHOD, AND COMPUTER PROGRAM PRODUCT FOR RANGE-BASED CLOCK ANALYSIS ASSOCIATED WITH THE FORMAL VERIFICATION OF AN ELECTRONIC CIRCUIT DESIGN

(71) Applicant: Cadence Design Systems, Inc., San Jose, CA (US)

(72) Inventors: Frederico Nascimento-Yoshida, San Jose, CA (US); Matheus Nogueira Fonseca, Minas Gerais (BZ)

(73) Assignee: Cadence Design Systems, Inc., San Jose, CA (US)

( * ) Notice: Subject to any disclaimer, the term of this patent is extended or adjusted under 35 U.S.C. 154(b) by 154 days.

(21) Appl. No.: 15/808,326

(22) Filed: Nov. 9, 2017

(51) Int. Cl.
*G06F 9/455* (2018.01)
*G06F 17/50* (2006.01)
*H04W 80/12* (2009.01)

(52) U.S. Cl.
CPC ...... *G06F 17/5031* (2013.01); *G06F 17/5068* (2013.01); *G06F 2217/84* (2013.01); *H04W 80/12* (2013.01)

(58) Field of Classification Search
USPC .................................. 716/106, 108, 111, 113
See application file for complete search history.

(56) References Cited

U.S. PATENT DOCUMENTS

| | | | |
|---|---|---|---|
| 7,159,200 B2 * | 1/2007 | Yoneda | H03K 5/1252 716/113 |
| 8,863,049 B1 * | 10/2014 | Lundgren | G06F 17/504 716/106 |
| 2003/0071665 A1 * | 4/2003 | Oyama | H03L 7/0814 327/116 |
| 2005/0216247 A1 * | 9/2005 | Ikeda | G06F 17/5018 703/19 |
| 2007/0195876 A1 * | 8/2007 | Prodic | H03K 5/135 375/238 |
| 2007/0283183 A1 * | 12/2007 | Komoto | G06F 1/06 713/500 |
| 2010/0199244 A1 * | 8/2010 | Kwok | G06F 17/504 716/113 |

* cited by examiner

*Primary Examiner* — Brian Ngo
(74) *Attorney, Agent, or Firm* — Mark H. Whittenberger, Esq.; Holland & Knight LLP

(57) ABSTRACT

The present disclosure relates to a method for formal verification of an electronic design. Embodiments may include receiving, using a processor, an electronic design having a plurality of clock configurations associated therewith and identifying a target clock configuration associated with the electronic design. Embodiments may also include receiving a range of clock factor values from a user, wherein each clock factor value corresponds to a frequency of the target clock configuration. Embodiments may further include selecting, via a formal engine, at least one clock factor value from the range and selecting, via the formal engine, at least one clock phase associated with the target clock configuration. Embodiments may also include performing formal verification of the electronic design, based upon, at least in part, the at least one clock factor value or the at least one clock phase.

17 Claims, 22 Drawing Sheets

400

The engine can return a counter example using clock values that are not valid, like the one below

Standard flow

```
clock clk --factor 1 --phase 1
prove --all
clock --clear clock clk --factor 2 --phase 1
prove --all
clock --clear clock clk --factor 2 --phase 2
prove --all
clock --clear clock clk --factor 3 --phase 1
prove --all
clock --clear clock clk --factor 3 --phase 2
prove --all
clock --clear clock clk --factor 3 --phase 3
prove --all
```

Range-Based flow

```
clock clk --from 1 --to 3
prove --all
```

FIG. 21

SYSTEM, METHOD, AND COMPUTER PROGRAM PRODUCT FOR RANGE-BASED CLOCK ANALYSIS ASSOCIATED WITH THE FORMAL VERIFICATION OF AN ELECTRONIC CIRCUIT DESIGN

FIELD OF THE INVENTION

The present disclosure relates to electronic design verification, and more specifically, to a method for range-based clock analysis associated with formal verification.

DISCUSSION OF THE RELATED ART

Formal verification relies upon a system of constraints to communicate the legal state space to the proof engines. The situation often arises that there is one or more contradictions in the constraints that causes there to be no legal state space. The complexity of the system of constraints, in combination with the design and glue logic, makes it difficult, if not impossible, to precisely locate the root cause of the conflict.

While formal verification methods get more popular and the number of users increase, the ratio of users that comprehend the mechanics involved in model checking engines decreases. With more inexperienced users and more complex systems, it is common to see people stuck waiting for formal engines to give them a conclusive result without any clue of what is causing that engine to spend all that time and computational resources. Experienced users might understand the common sources of complexities for model checking engines and find them manually, however, when facing new and bigger designs they might be unable to determine what causes the engines to take more time.

In multi-clock domain designs that can operate under different clock configurations, the clocks' relationships are very important for the design functionality, therefore it is fundamental to check if there are bugs caused by clock interactions.

Normally, a formal verification tool allows for the specification of a fixed frequency ratio and phase difference between clocks. To test multiple clock configurations, the user must then run multiple setups with different clock configurations. However, since it is challenging to cover all of the valid clock frequency/phase differences between clocks, bugs arising from specific clock configurations may go unnoticed.

SUMMARY OF DISCLOSURE

In one or more embodiments of the present disclosure, a computer-implemented method for formal verification of an electronic design is provided. The method may include receiving, using a processor, an electronic design having a plurality of clock configurations associated therewith and identifying a target clock configuration associated with the electronic design. The method may further include receiving a range of clock factor values from a user, wherein each clock factor value corresponds to a frequency of the target clock configuration. The method may further include selecting, via a formal engine, at least one clock factor value from the range and selecting, via the formal engine, at least one clock phase associated with the target clock configuration. The method may also include performing formal verification of the electronic design, based upon, at least in part, the at least one clock factor value or the at least one clock phase.

One or more of the following features may be included. In some embodiments, the clock factor value may be associated with a non-deterministic constant. The method may also include identifying an internal fastest clock and changing the at least one clock factor value based upon, at least in part, a cycle associated with the internal fastest clock. The formal engine may be configured to consider all valid clock factor values during formal verification. The formal engine may be configured to consider all valid clock phases during formal verification. Selecting, via a formal engine, at least one clock factor value may be performed using a multiplexer in communication with a ring counter. Selecting, via the formal engine, at least one clock phase may be performed using a multiplexer in communication with a ring counter.

In one or more embodiments of the present disclosure a computer-readable storage medium having stored thereon instructions, which when executed by a processor result in one or more operations is provided. Operations may include receiving, using a processor, an electronic design having a plurality of clock configurations associated therewith and identifying a target clock configuration associated with the electronic design. Operations may further include receiving a range of clock factor values from a user, wherein each clock factor value corresponds to a frequency of the target clock configuration. Operations may further include selecting, via a formal engine, at least one clock factor value from the range and selecting, via the formal engine, at least one clock phase associated with the target clock configuration. Operations may also include performing formal verification of the electronic design, based upon, at least in part, the at least one clock factor value or the at least one clock phase.

One or more of the following features may be included. In some embodiments, the clock factor value may be associated with a non-deterministic constant. Operations may also include identifying an internal fastest clock and changing the at least one clock factor value based upon, at least in part, a cycle associated with the internal fastest clock. The formal engine may be configured to consider all valid clock factor values during formal verification. The formal engine may be configured to consider all valid clock phases during formal verification. Selecting, via a formal engine, at least one clock factor value may be performed using a multiplexer in communication with a ring counter. Selecting, via the formal engine, at least one clock phase may be performed using a multiplexer in communication with a ring counter.

In one or more embodiments of the present disclosure, a system for formal verification of an electronic design is provided. The system may include a computing device having at least one processor configured to receive an electronic design having a plurality of clock configurations associated therewith. The at least one processor may be further configured to identify a target clock configuration associated with the electronic design. The at least one processor may be further configured to receive a range of clock factor values from a user, wherein each clock factor value corresponds to a frequency of the target clock configuration. The at least one processor may be further configured to select, via a formal engine, at least one clock factor value from the range, the at least one processor further configured to select, via the formal engine, at least one clock phase associated with the target clock configuration. The at least one processor may be further configured to perform formal verification of the electronic design, based upon, at least in part, the at least one clock factor value or the at least one clock phase.

One or more of the following features may be included. In some embodiments, the clock factor value may be associated with a non-deterministic constant. The at least one processor may be further configured to identify an internal fastest clock and change the at least one clock factor value based upon, at least in part, a cycle associated with the internal fastest clock. The formal engine may be configured to consider all valid clock factor values during formal verification. The formal engine may be configured to consider all valid clock phases during formal verification. Selecting, via a formal engine, at least one clock factor value may be performed using a multiplexer in communication with a ring counter.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 21 is a diagram depicting an embodiment in accordance with the present disclosure.

DETAILED DESCRIPTION

Figure 1:
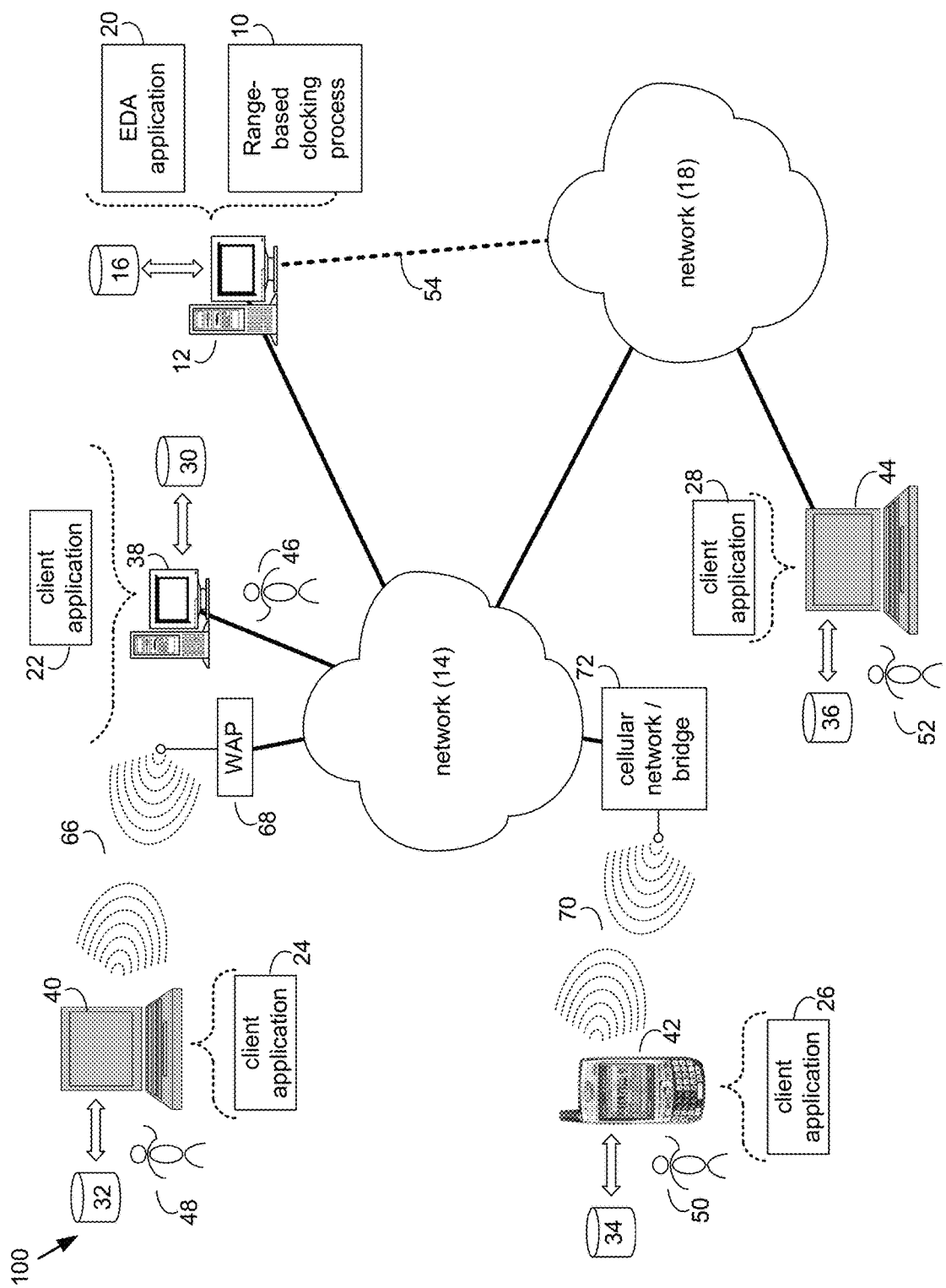
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a range-based clocking process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, range-based clocking process 10 may reside on and be executed, in whole or in part, by a client electronic device, such as a personal computer, notebook computer, personal digital assistant, or the like.

The instruction sets and subroutines of range-based clocking process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Web server, that allows for HTTP (i.e., HyperText Transfer Protocol) access to server computer 12 via network 14 (Web server is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization and/or verification.

Range-based clocking process 10 may be a stand alone application, or may be an applet/application/script that may interact with and/or be executed within EDA application 20. In addition/as an alternative to being a server-side process, range-based clocking process 10 may be a client-side process (not shown) that may reside on a client electronic device (described below) and may interact with an EDA client application (e.g., one or more of EDA client applications 22, 24, 26, 28). Further, range-based clocking process 10 may be a hybrid server-side/client-side process that may interact with EDA application 20 and an EDA client application (e.g., one or more of client applications 22, 24, 26, 28). As such, range-based clocking process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize range-based clocking process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
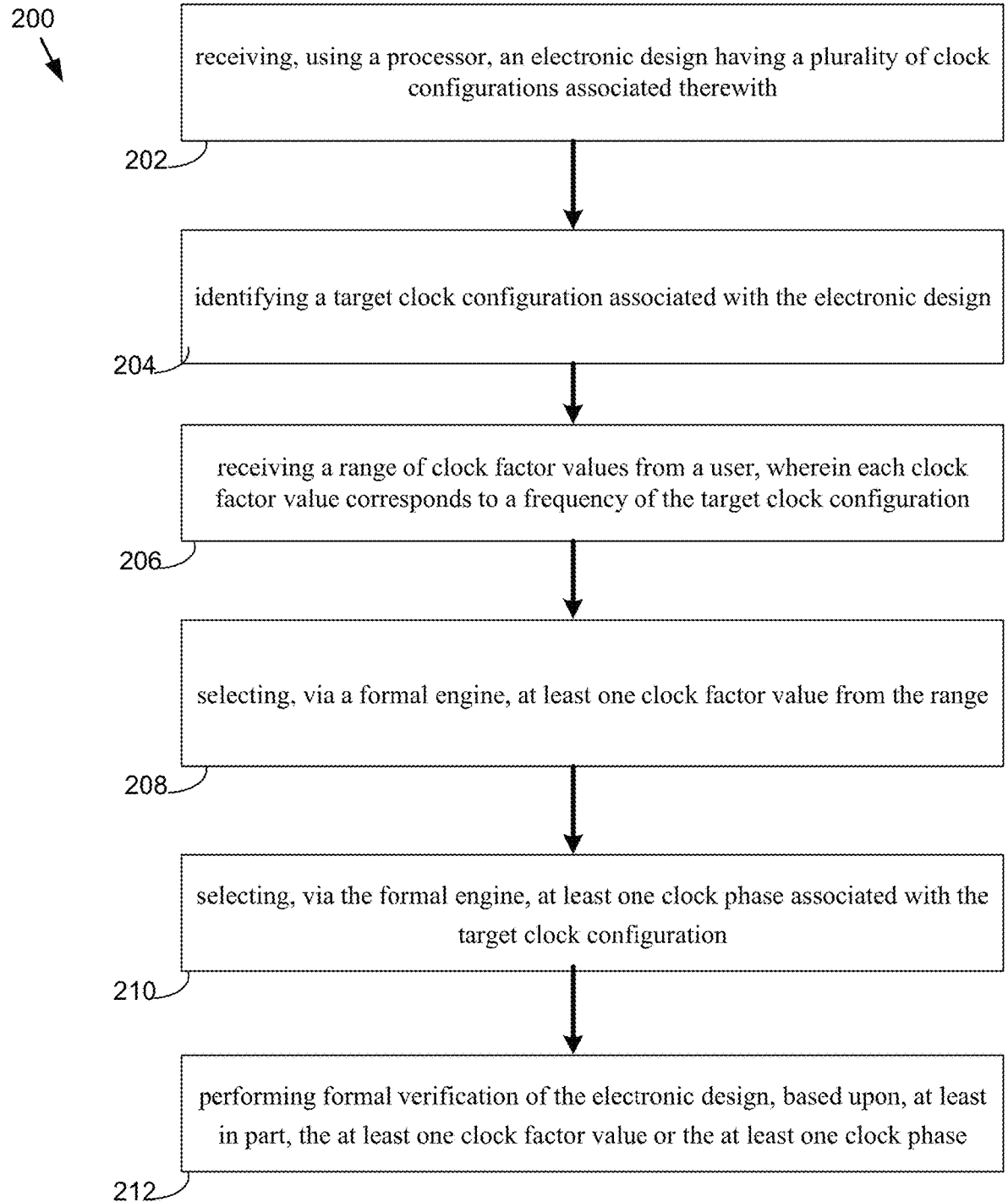
FIG. 2 is a flowchart depicting operations consistent with the range-based clocking process in accordance with an embodiment of the present disclosure.

Referring now to FIG. 2, an exemplary flowchart 200 depicting operations consistent with range-based clocking process 10 is provided. Embodiments may include receiving (202), using a processor, an electronic design having a plurality of clock configurations associated therewith and identifying (204) a target clock configuration associated with the electronic design. Embodiments may also include receiving (206) a range of clock factor values from a user, wherein each clock factor value corresponds to a frequency of the target clock configuration. Embodiments may further include selecting (208), via a formal engine, at least one clock factor value from the range and selecting (210), via the formal engine, at least one clock phase associated with the target clock configuration. Embodiments may also include performing (212) formal verification of the electronic design, based upon, at least in part, the at least one clock factor value or the at least one clock phase.

As discussed above, in multi-clock domain designs that can operate under different clock configurations, the clocks' relationships are very important for the design functionality, therefore it is fundamental to check if there are bugs caused by clock interactions.

Normally, a formal verification tool allows for the specification of a fixed frequency ratio and phase difference between clocks. To test multiple clock configurations, the user must then run multiple setups with different clock configurations. However, since it is challenging to cover all of the valid clock frequency/phase differences between clocks, bugs arising from specific clock configurations may go unnoticed.

Embodiments of the range-based clocking process 10 may be configured to provide a clock abstraction for an EDA application (e.g. a formal verification tool) that models a range of possible clock setups in one formal model. In this model, the formal engine may have the freedom to select any of the valid clock factors and phase difference (e.g., for a given granularity). Accordingly, all valid clock frequency ratios and the phase difference between clocks may be considered by the formal analysis of each property (e.g. assertion or cover) being verified.

Figure 3:
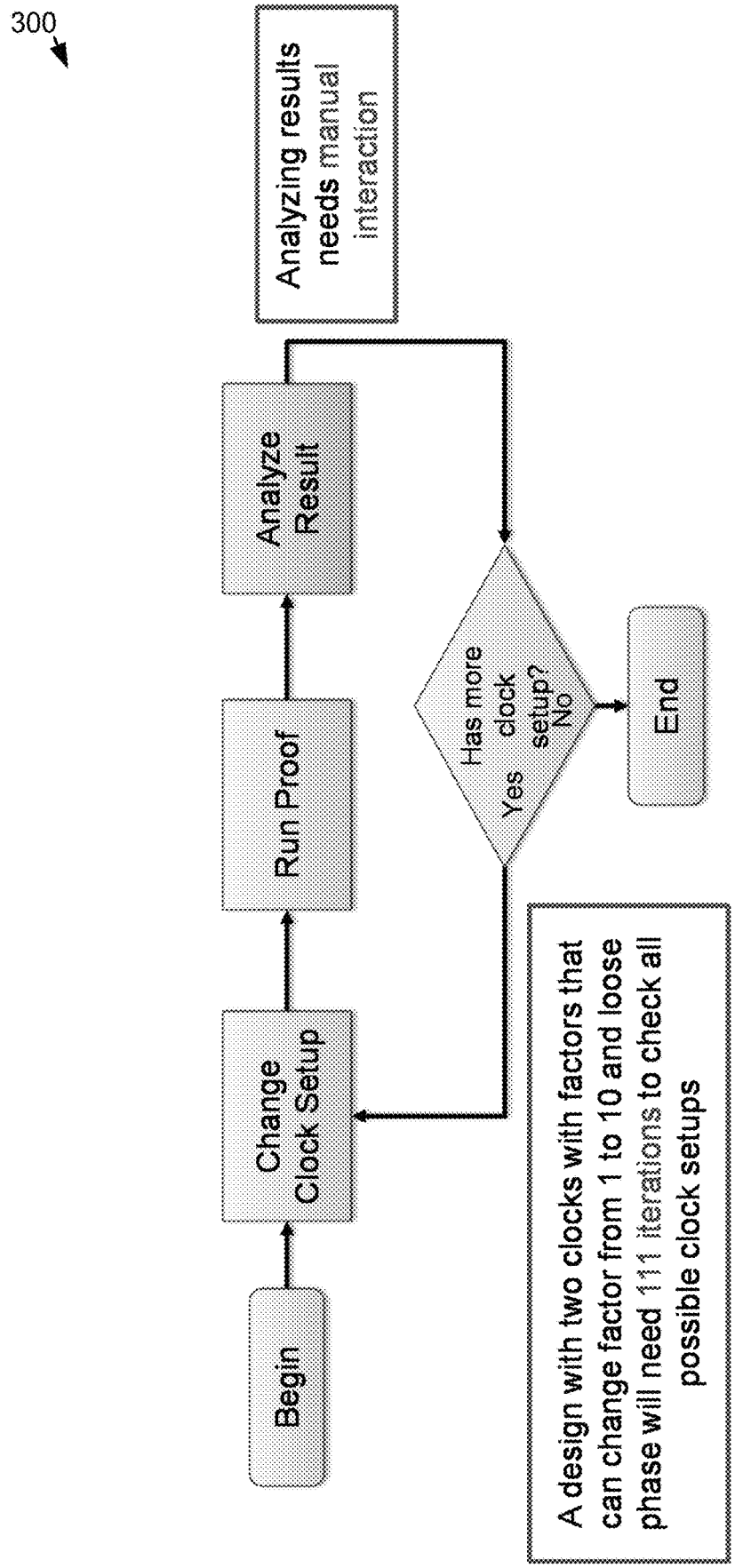
FIG. 3 is a diagram depicting an embodiment in accordance with the present disclosure.
Figure 4:
FIG. 4 is a diagram depicting an embodiment in accordance with the present disclosure.

In existing approaches, and referring to FIGS. 3-4, in order to verify a design that can operate under multiple clock configurations there are two conventional implementations. The first, as shown in FIG. 3, is to have multiple runs of the formal tool, each run having a different clock configuration. However, this is an exhaustive approach that needs many manual interactions analyzing the results in each setup. The second approach, as shown in FIG. 4, is to configure a free-running clock environment. However, in this approach the formal engines may generate a large number of spurious counter-examples, since the engine's model is underconstrained and will assign invalid values to the clock signals.

Each of the approaches discussed above suffers from a number of problems. One issue is the amount of manual work required to test all possible clock setups (otherwise a bug arising from specific clock configuration may escape).

The other is the increase in the amount of state spaces that are not being constrained when freeing the clock signals.

Accordingly, and referring now to FIGS. 5-22, embodiments of range-based clocking process 10 may provide an abstraction that allows for a formal engine to select any of the valid clock factors and clock phases. In some embodiments, the clock factor may be constrained to be stable throughout formal analysis. As a result, all valid clock factors and phases (for a given granularity) may be considered by formal analysis. It should also be noted that although embodiments disclosed herein focus primarily upon clock factor and phase, the teachings of the present disclosure may also allow for the selection of a free duty cycle.

Figure 5:
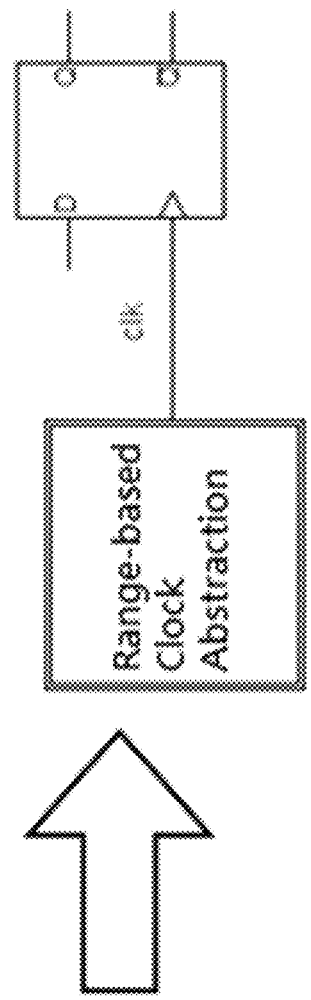
FIG. 5 is a diagram depicting an embodiment in accordance with the present disclosure.

For example, and as shown in FIG. 5, range-based clocking process 10 may create an abstraction for a formal verification tool (e.g. EDA application 20) that may verify all possible clock setups in one formal model. In operation, the formal engine may consider all possible clock setups throughout a single formal analysis. In this way, the formal engine has the freedom to select the factor of a clock pin and/or select the phase of a clock pin. However, the formal engine may not change the clock factor/phase between cycles, assuring the clock wave sanity.

Figure 6:
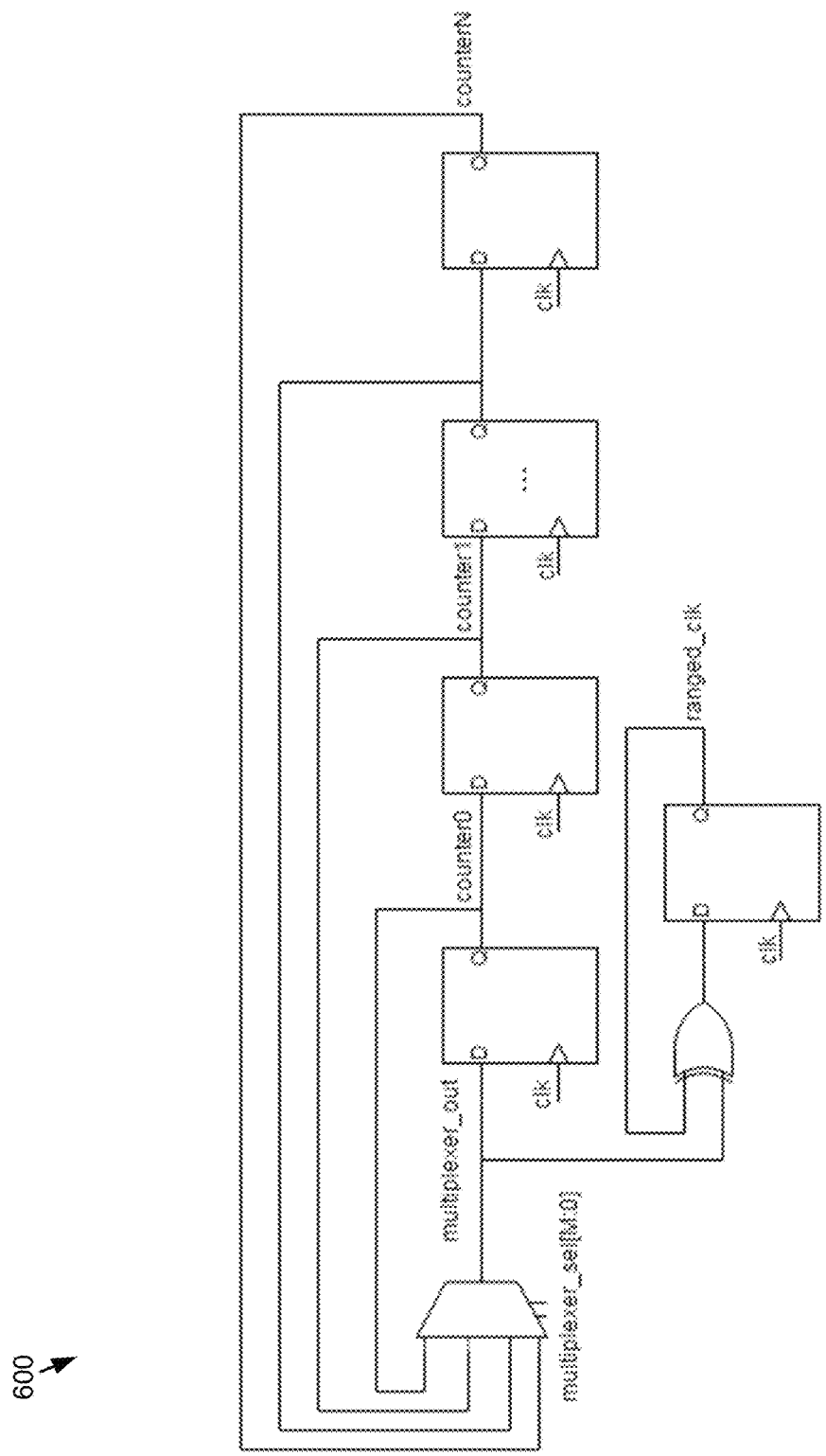
FIG. 6 is a diagram depicting an embodiment in accordance with the present disclosure.
Figure 7:
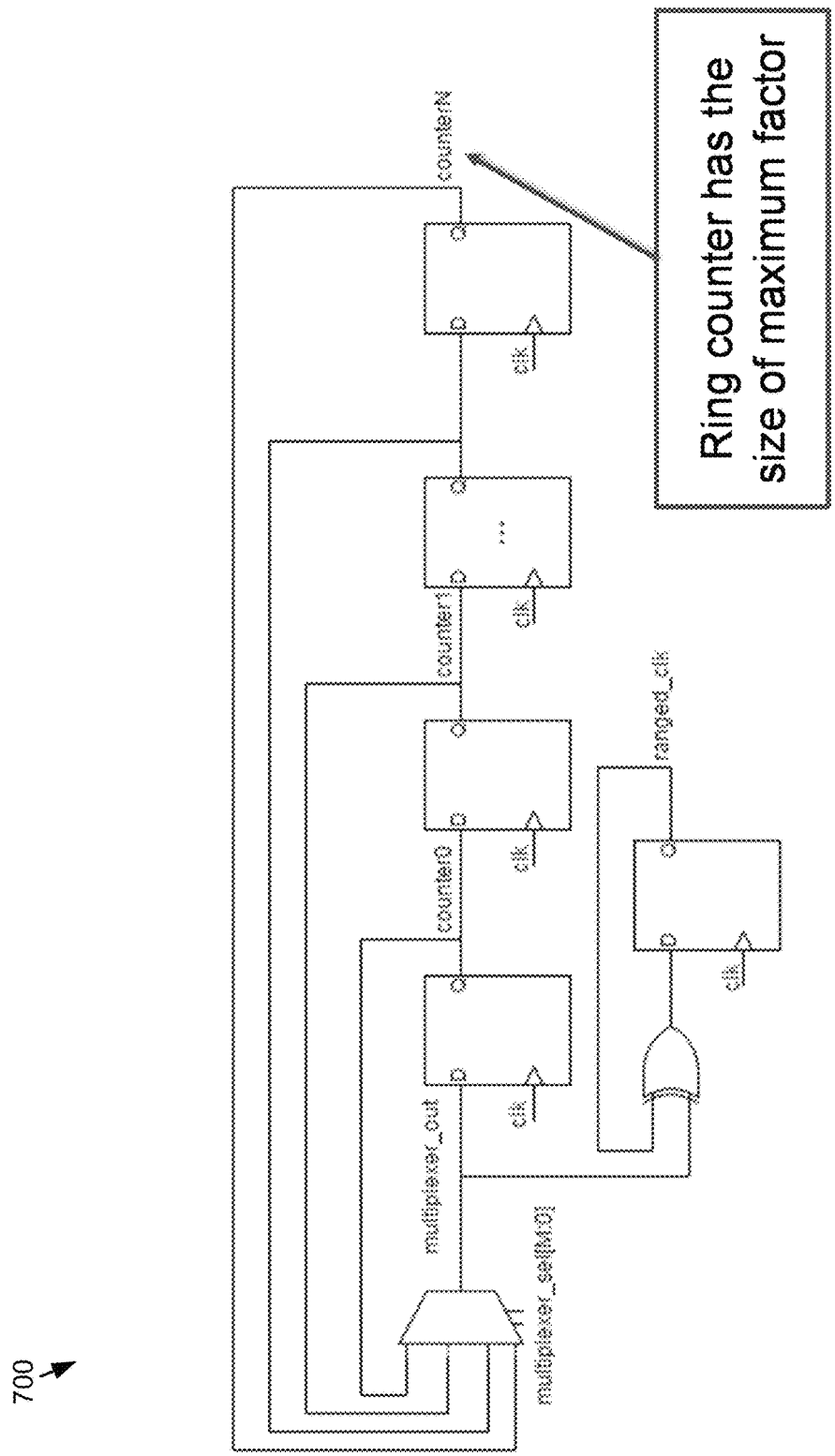
FIG. 7 is a diagram depicting an embodiment in accordance with the present disclosure.
Figure 8:
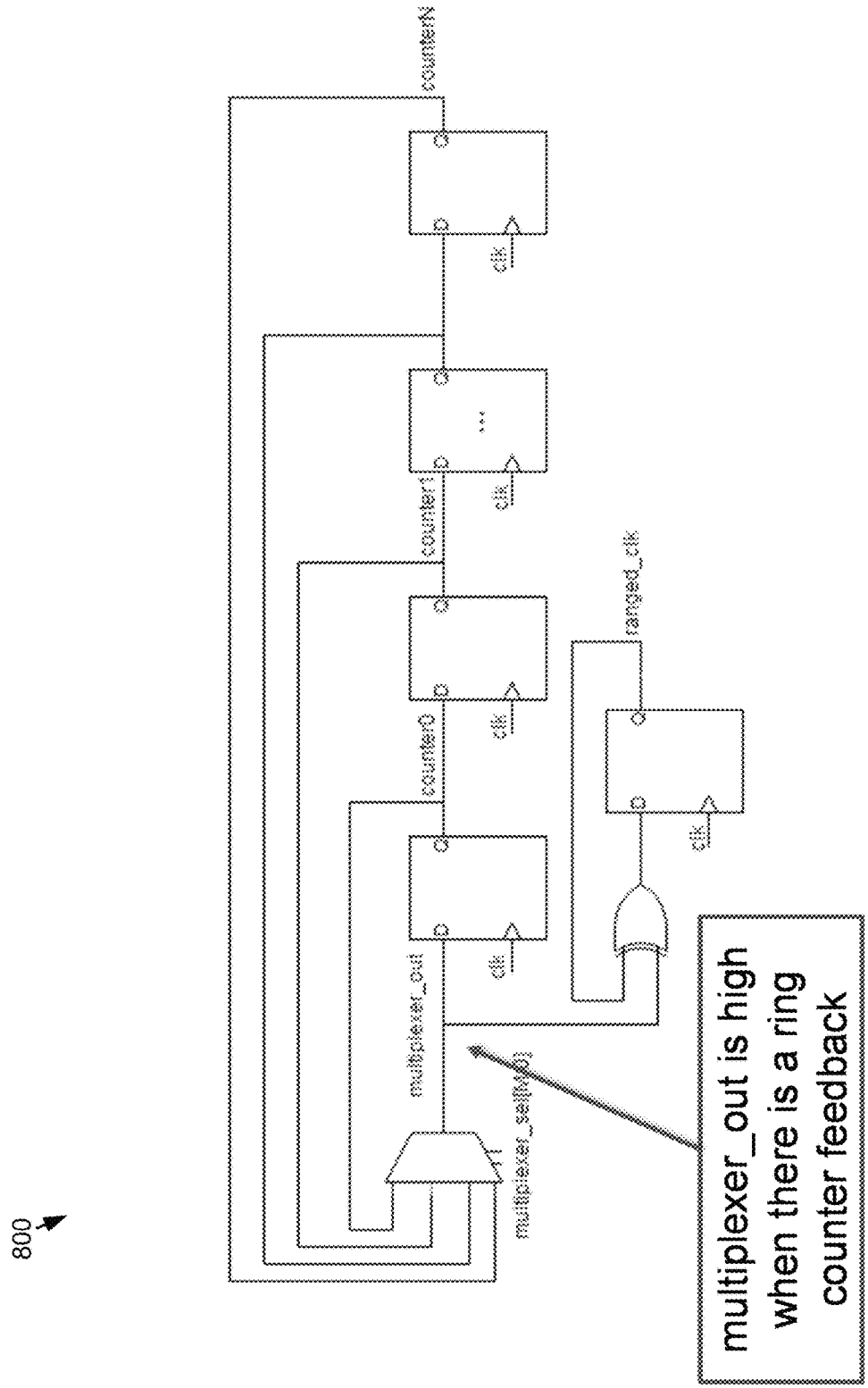
FIG. 8 is a diagram depicting an embodiment in accordance with the present disclosure.
Figure 9:
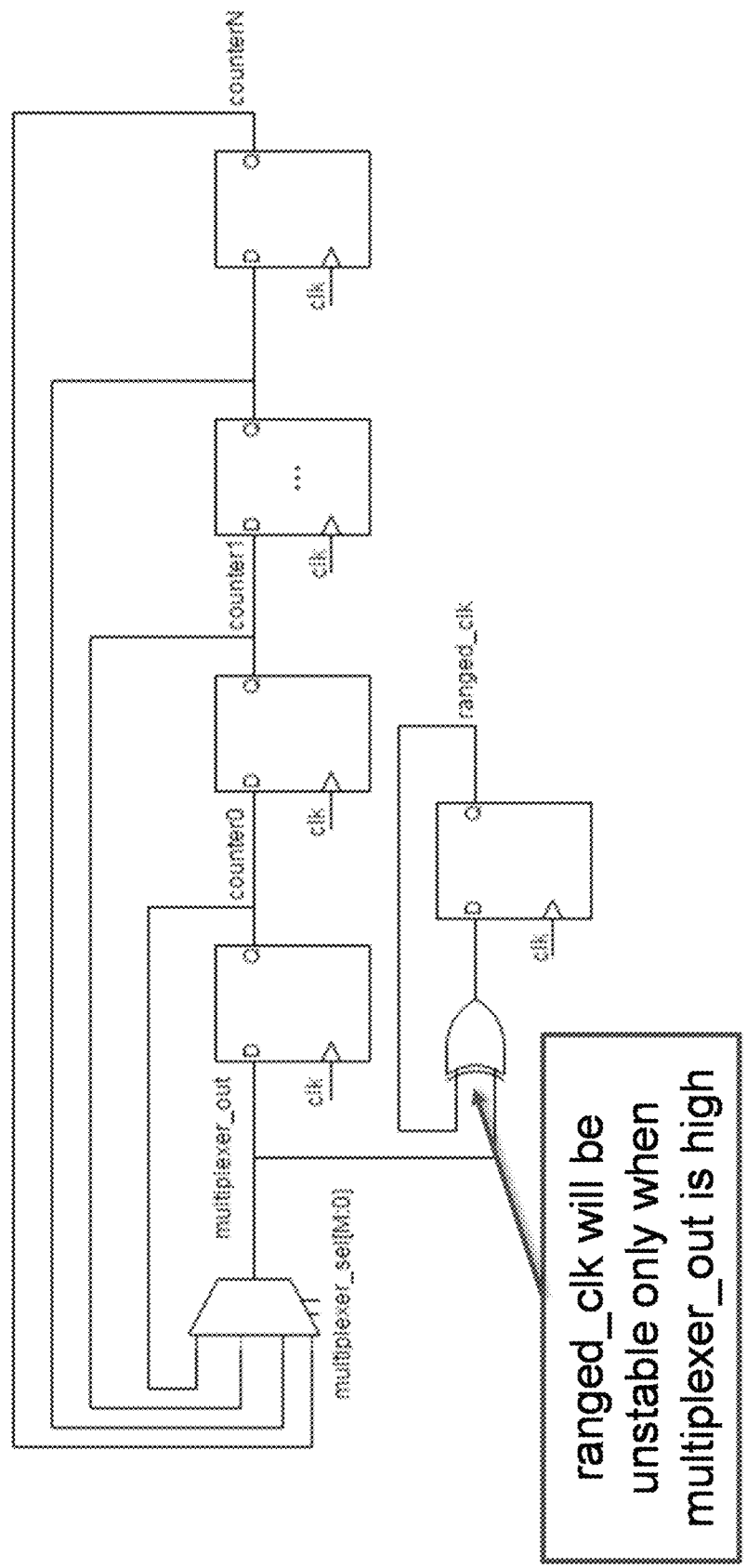
FIG. 9 is a diagram depicting an embodiment in accordance with the present disclosure.
Figure 10:
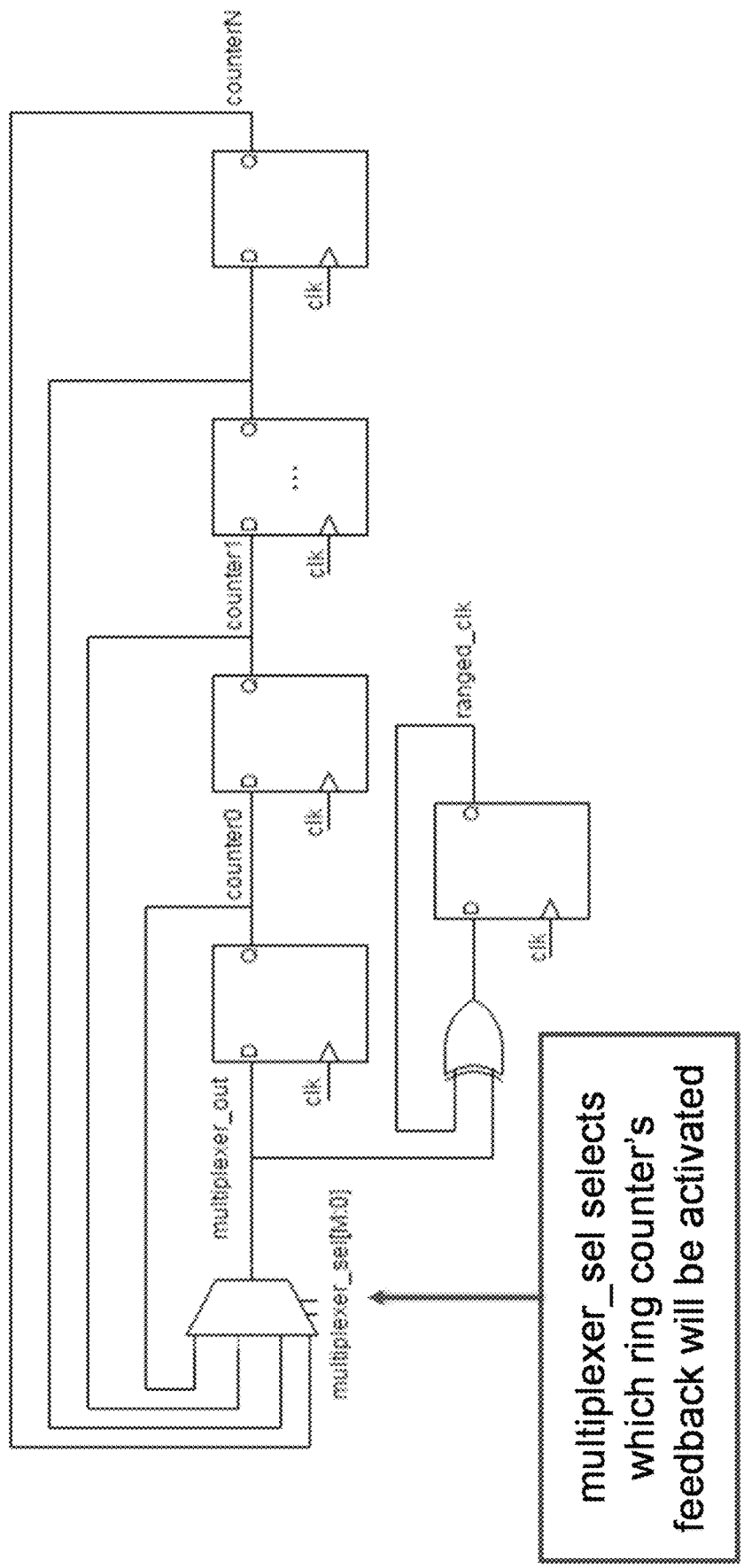
FIG. 10 is a diagram depicting an embodiment in accordance with the present disclosure.
Figure 11:
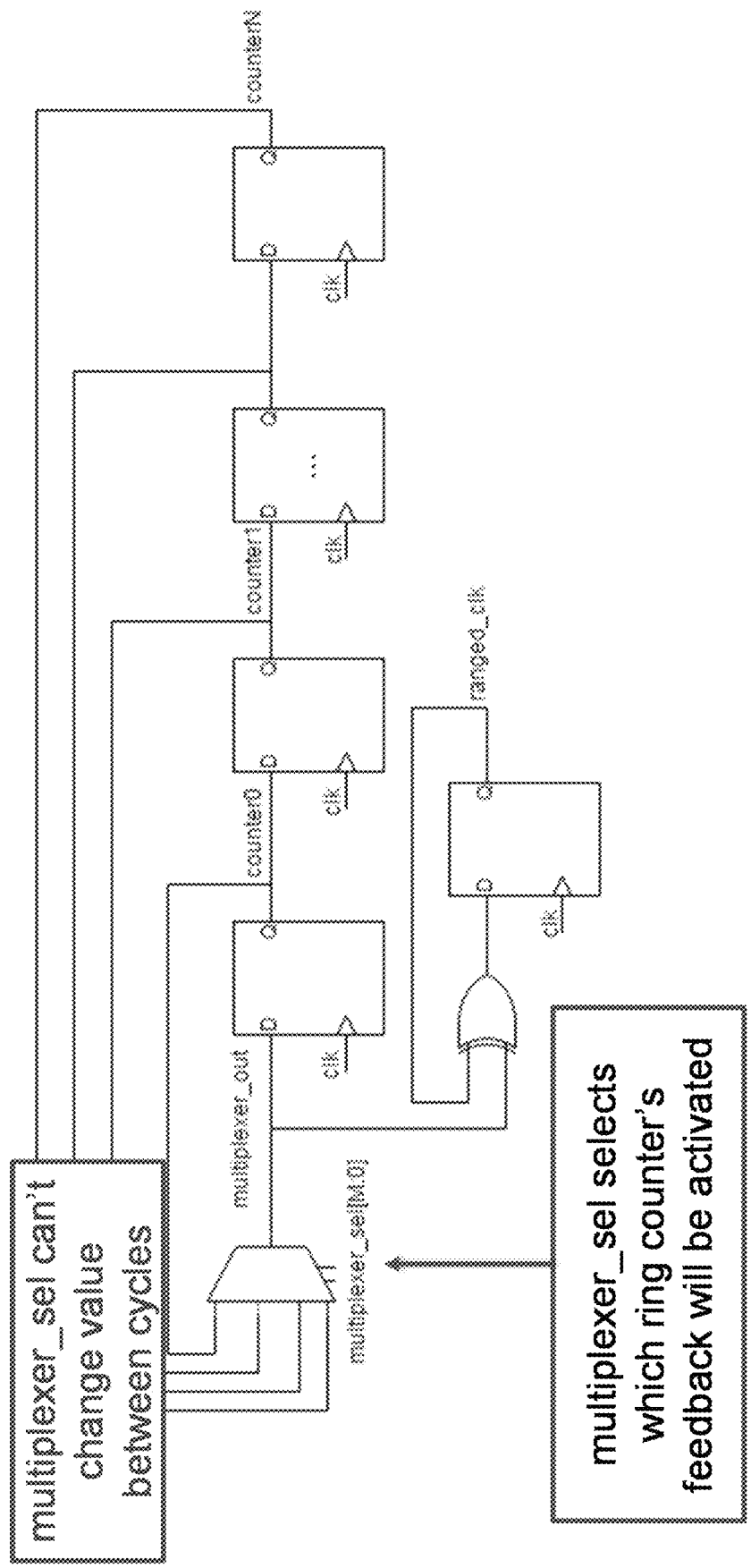
FIG. 11 is a diagram depicting an embodiment in accordance with the present disclosure.
Figure 12:
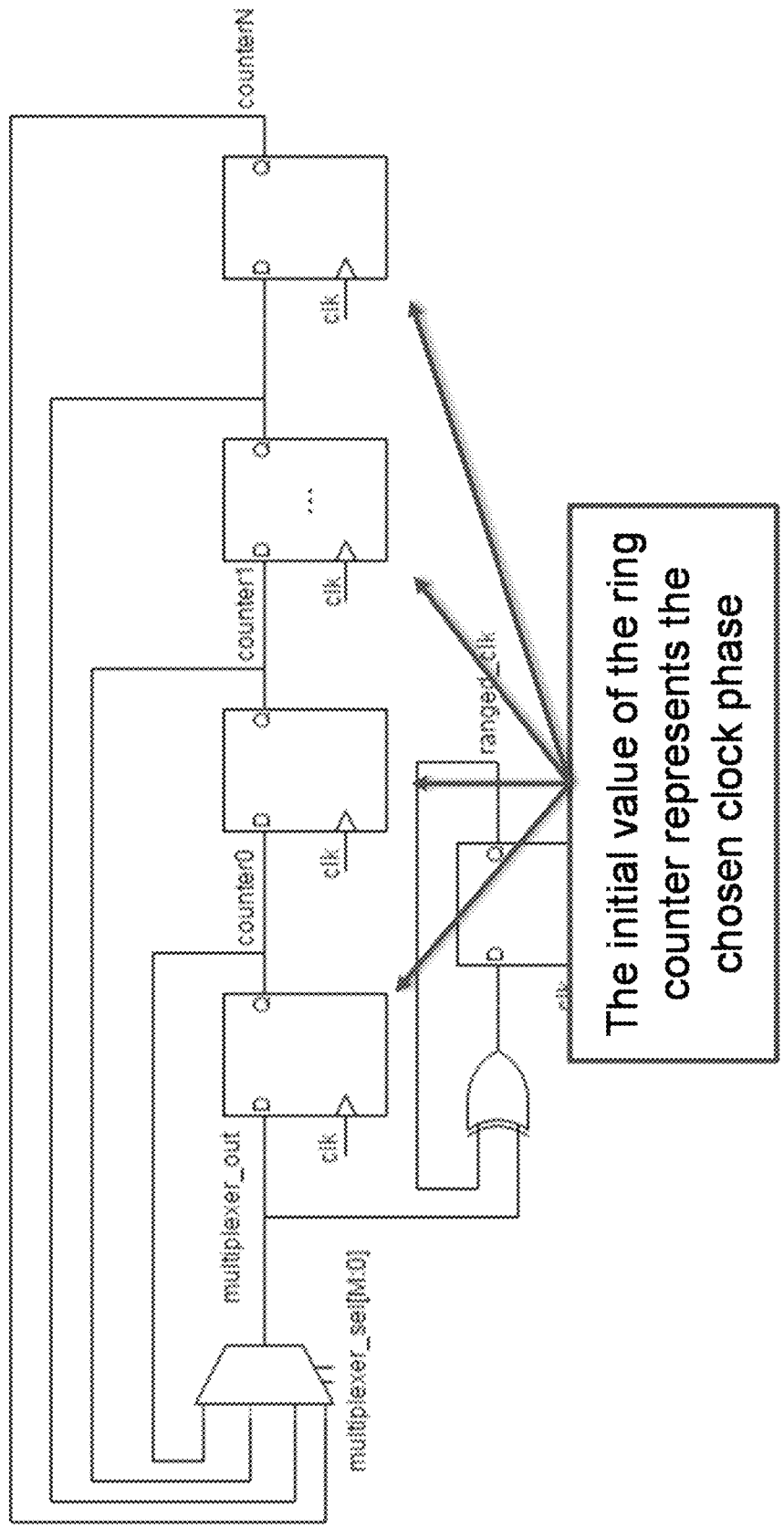
FIG. 12 is a diagram depicting an embodiment in accordance with the present disclosure.
Figure 13:
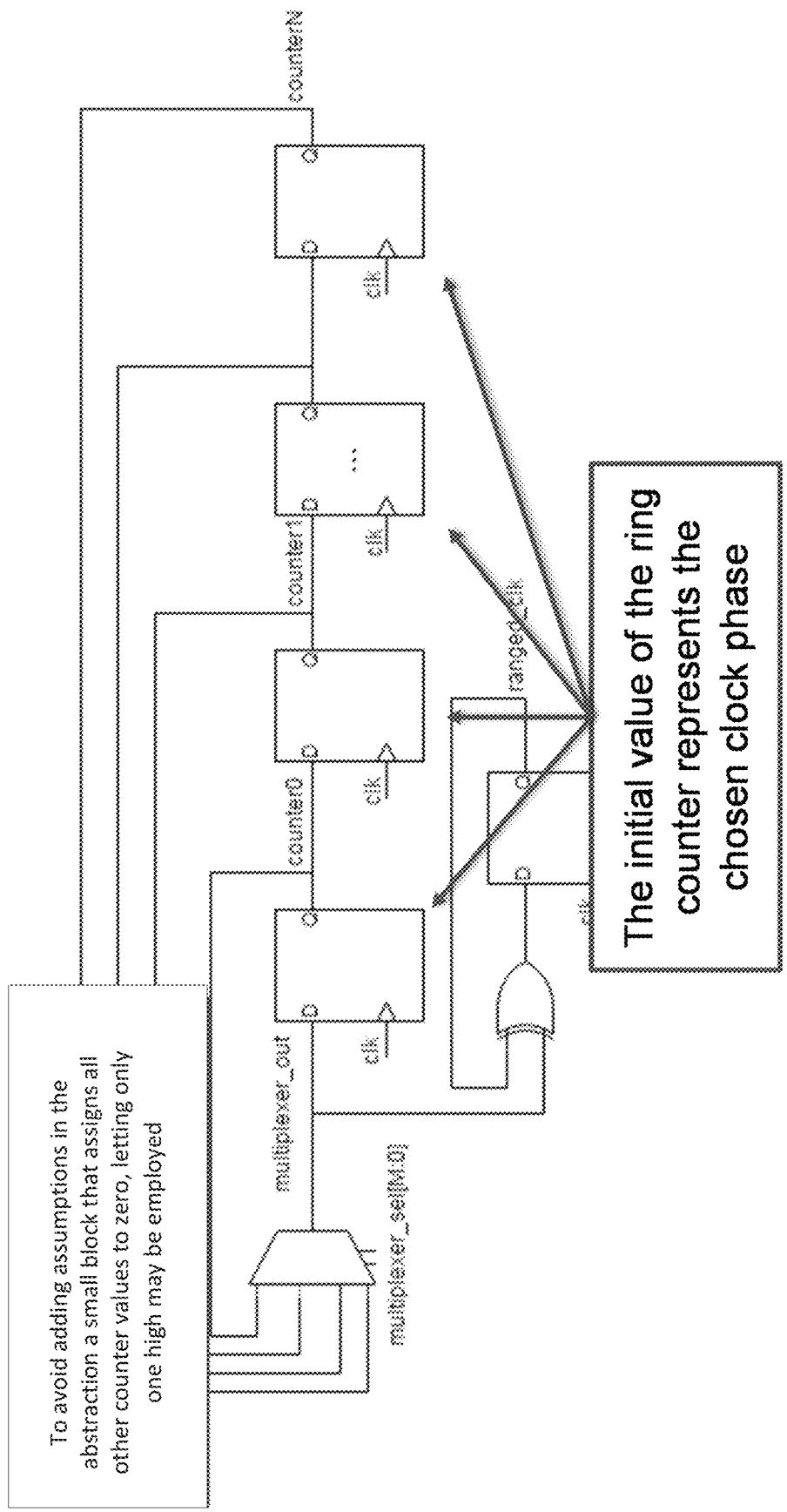
FIG. 13 is a diagram depicting an embodiment in accordance with the present disclosure.

Referring also to FIG. 6, an embodiment depicting a diagram 600 that may be used in accordance with range-based clocking process 10 is provided. This example consists of a ring counter of size N (where N is the maximum factor) and provides for an abstraction of a clock that can change its factor from 1 to N. As shown in the Figure, a multiplexer that selects between one output of the ring counter's flops, and has non-deterministic constants (e.g, the mux inputs are constant values that can assume a value only once in the first cycle, a static design configuration, etc.) as selectors is provided. Its output may also be the input of the first flop in the ring-counter. The ring-counter may be configured to count the number of cycles that the clock pin is stable. In some embodiments, the multiplexer's selector chooses the clock factor, enabling the ring-counter's feedback in the selected input. Since the multiplexer's selector may be a non-deterministic constant it may change only its initial value which makes the clock factor the same for all cycles. In FIG. 6, the output "ranged_clk" may represent the design's clock pin. FIG. 7 depicts that the ring counter may have the size of the maximum factor and FIG. 8 shows that "multiplexer_out" is high when there is ring counter feedback. FIG. 9 shows that the "ranged_clk" signal may be unstable only when the "multiplexer_out" signal is high. FIG. 10 shows that the multiplexer may select which ring counter's feedback may be activated and FIG. 11 shows that the multiplexer cannot change the value between cycles. FIG. 12 shows that the initial value of the ring counter represents the chosen clock phase and FIG. 13 shows that, in some embodiments, only one flop in the ring counter may be initialized with a high value.

Figure 14:
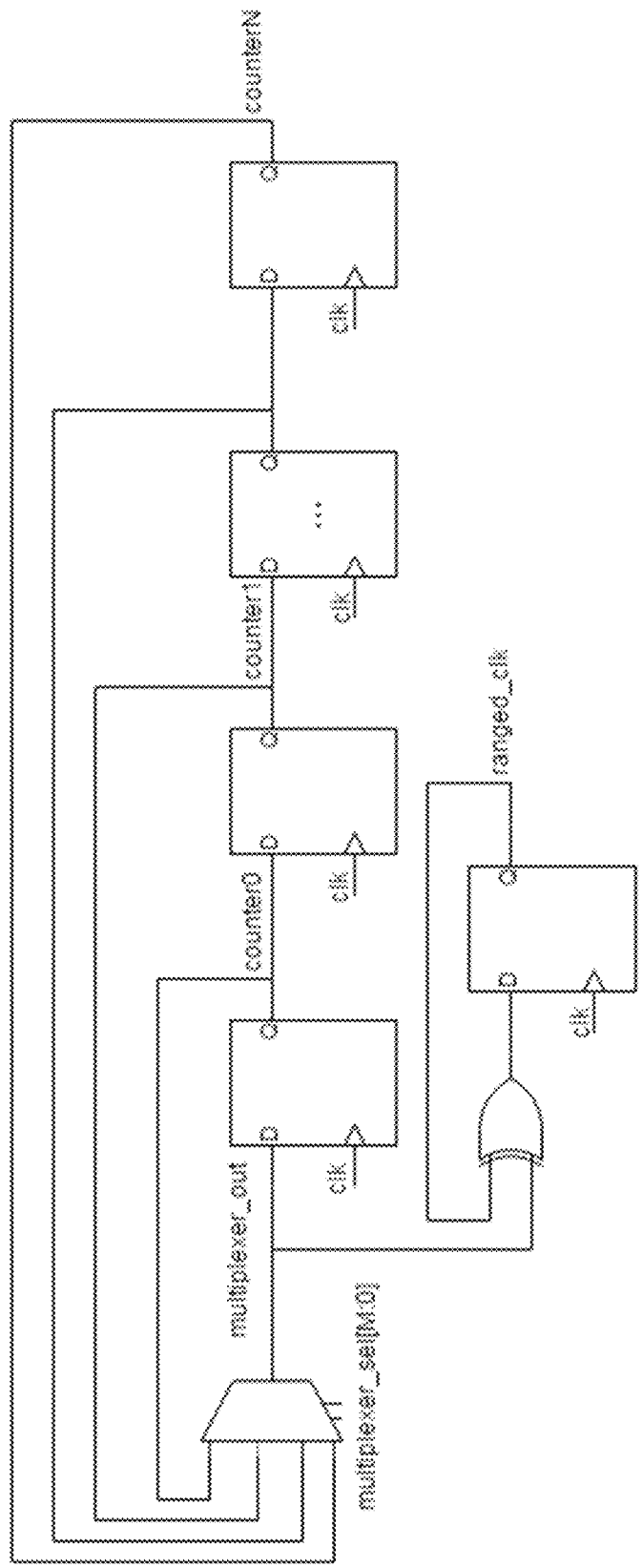
FIG. 14 is a diagram depicting an embodiment in accordance with the present disclosure.

In operation, and referring to FIG. 14, the multiplexer may select the ring counter size that may be used, which may correspond to the chosen clock factor. However, the multiplexer may not be able to change values between cycles. The initial value of the ring counter may represent the chosen clock phase and only one flop may be initialized with a high value. The clock pin (e.g., ranged_clk) may change value only when a complete cycle in the ring counter has occurred.

Figure 15:
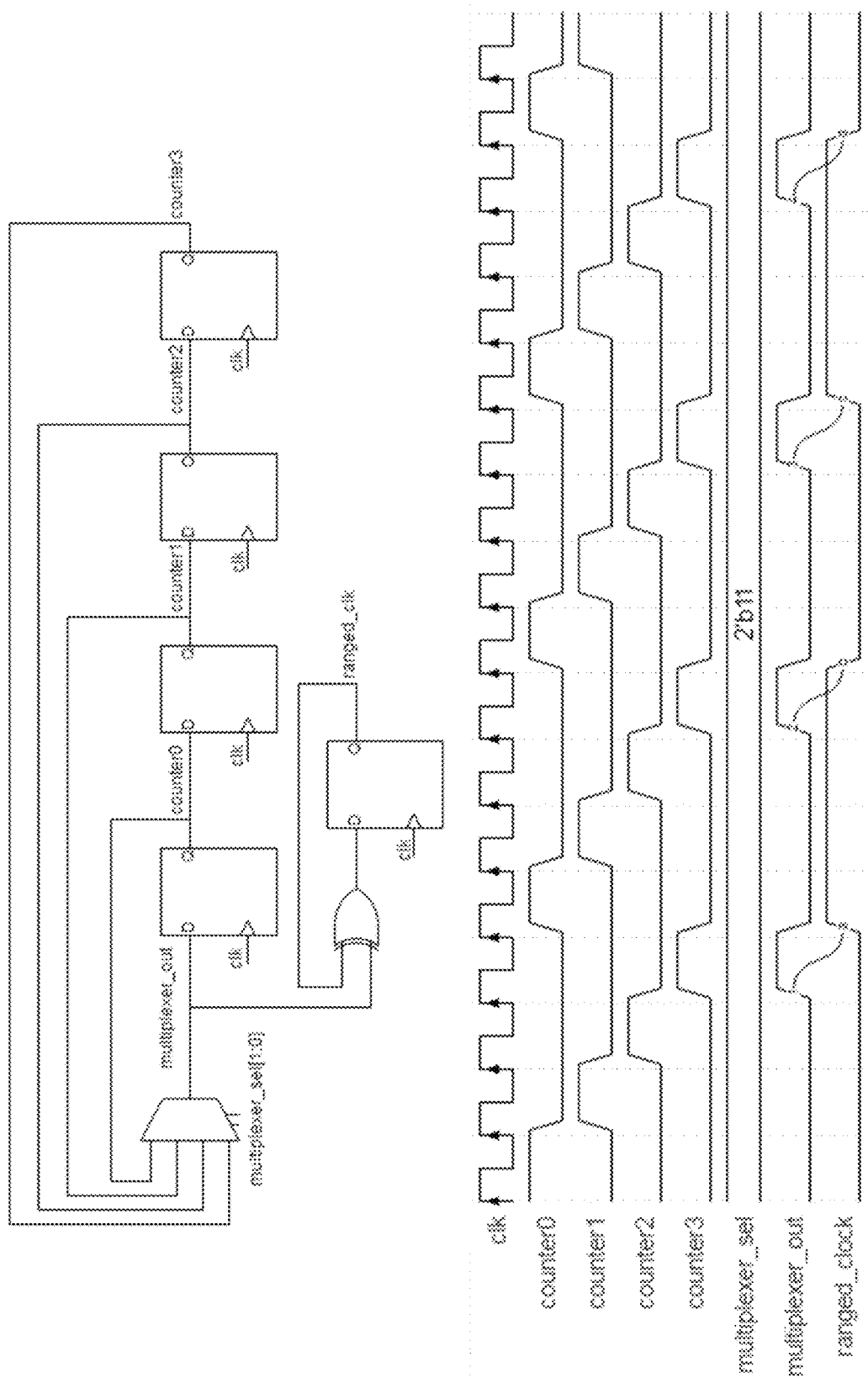
FIG. 15 is a diagram depicting an embodiment in accordance with the present disclosure.
Figure 16:
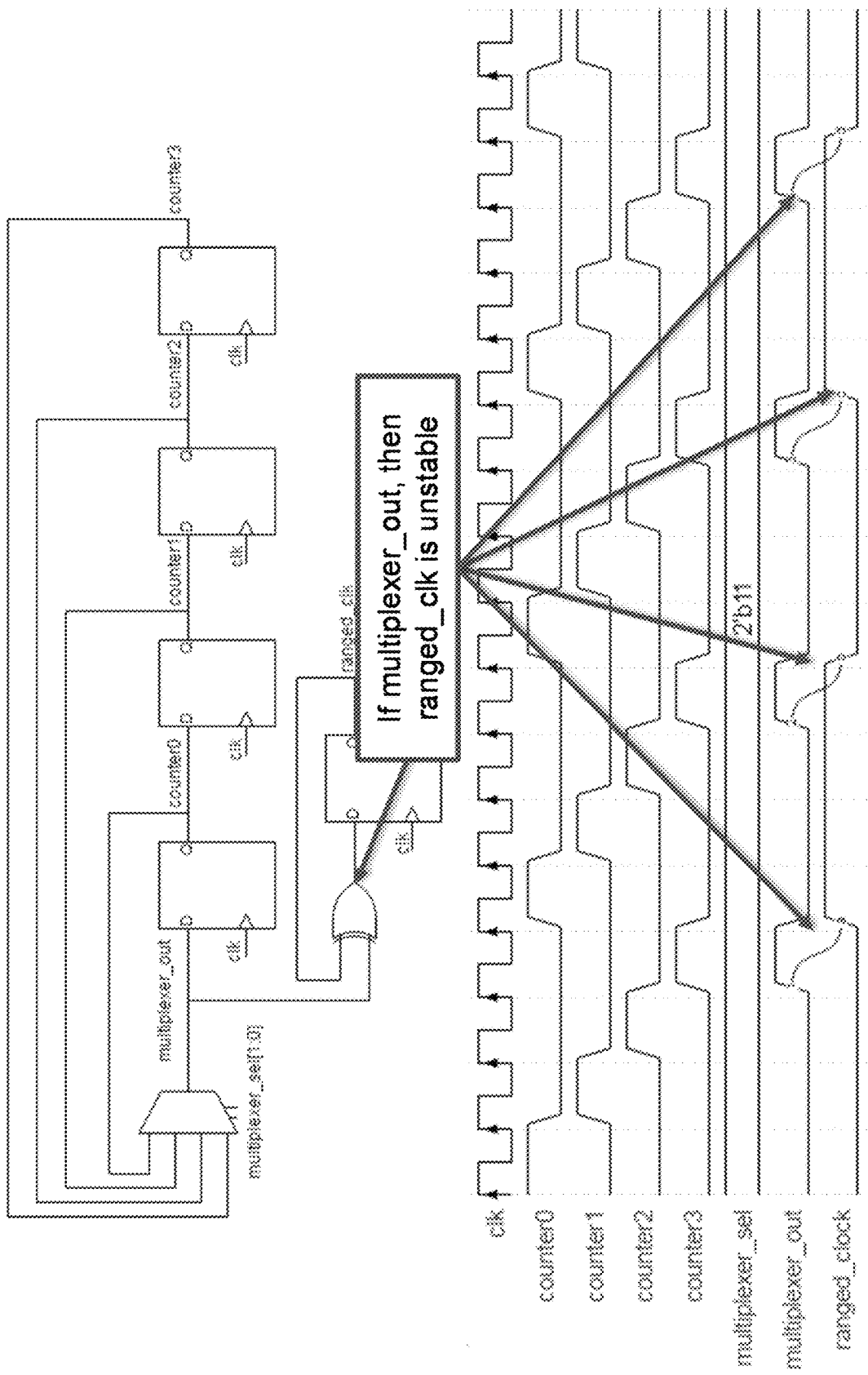
FIG. 16 is a diagram depicting an embodiment in accordance with the present disclosure.
Figure 17:
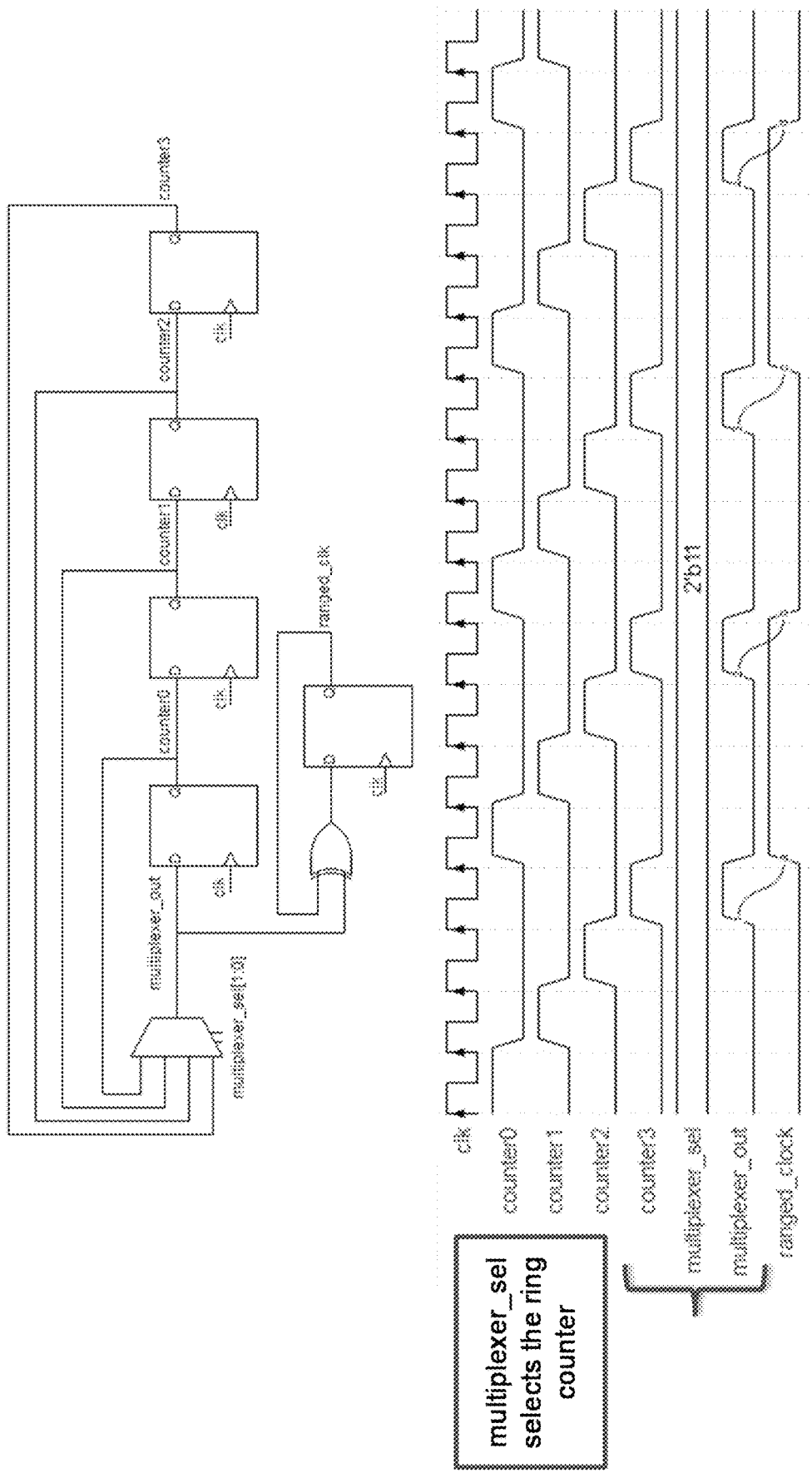
FIG. 17 is a diagram depicting an embodiment in accordance with the present disclosure.

Referring now to FIGS. 15-17, a range-based clock example consistent with embodiments included herein is provided. FIG. 15 shows a clock having a selected factor 4 and phase 4. In some embodiments, only one flop in the ring-counter may be initialized as high, and its depth may represent the clock phase, since it means that the counter did not start at 0. When the ring-counter's data completes a loop, that it is selected by the multiplexer, it means that the clock pin will change value in the next cycle, and it reinitializes the ring-counter (as is shown in FIG. 15). FIG. 16 shows that depending upon the value of the multiplexer_out signal, the ranged_clk signal may be unstable. It can be seen in FIG. 17 that the multiplexer_sel signal selects the ring counter.

Figure 18:
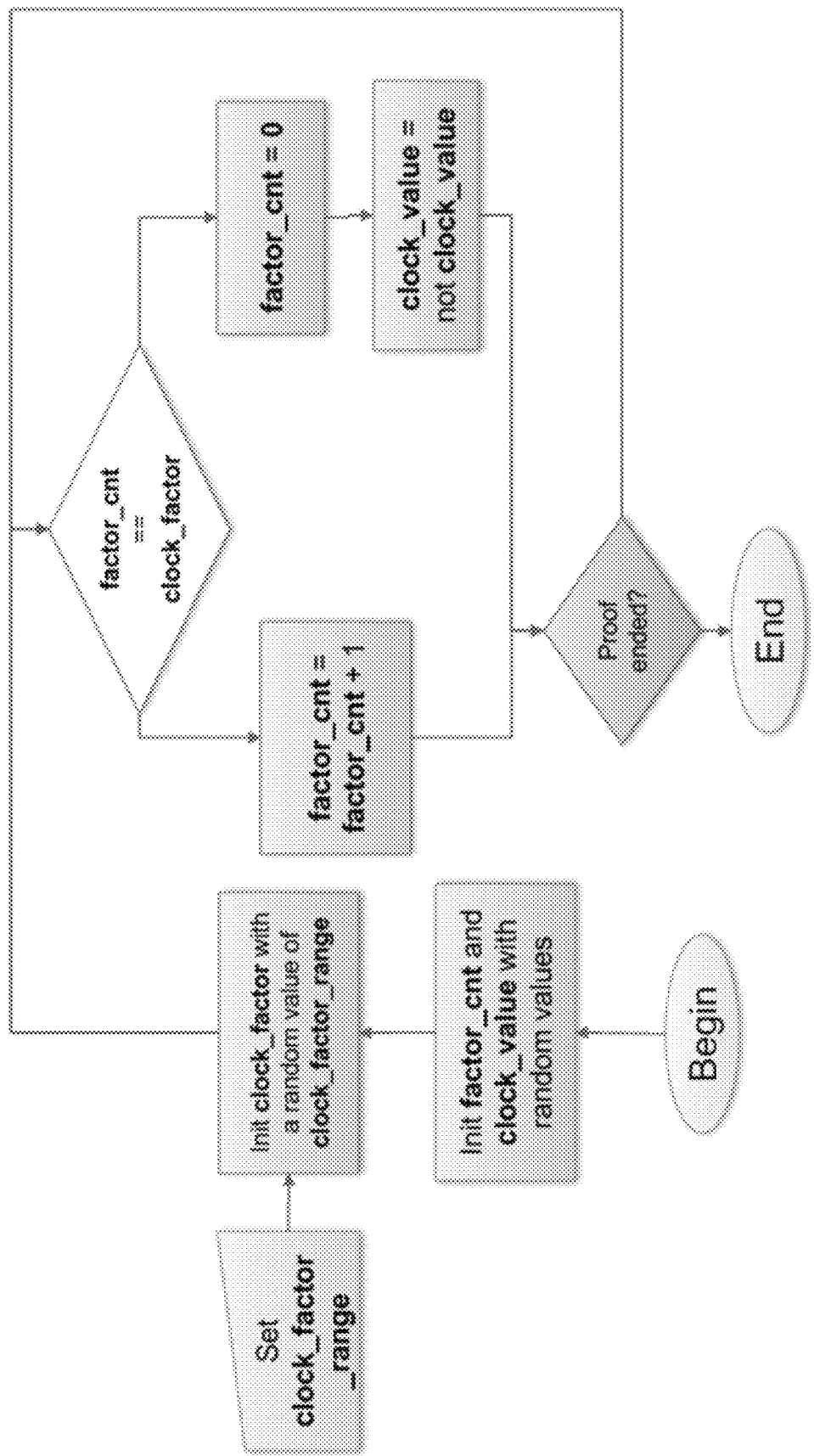
FIG. 18 is a diagram depicting an embodiment in accordance with the present disclosure.
Figure 19:
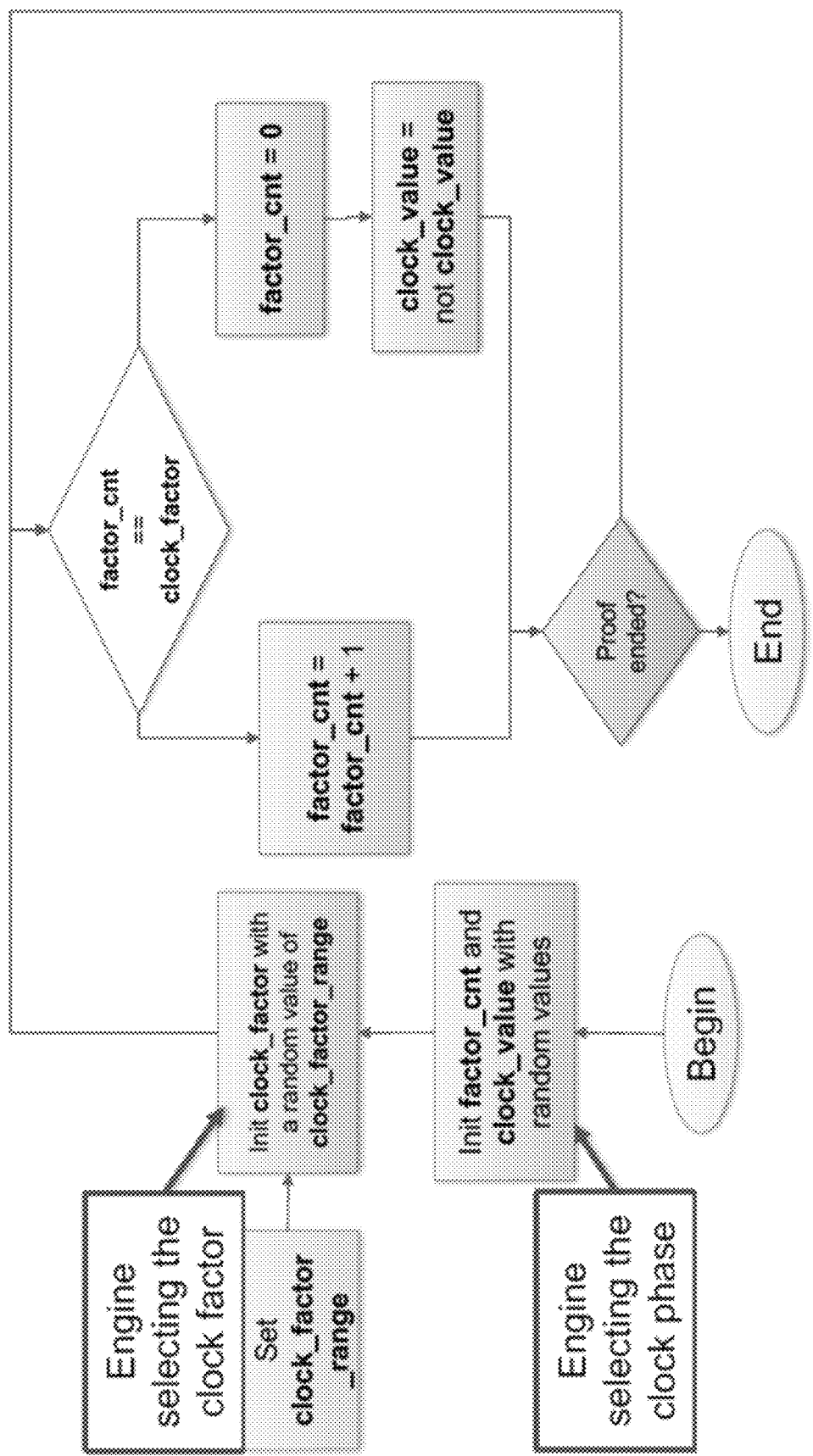
FIG. 19 is a diagram depicting an embodiment in accordance with the present disclosure.
Figure 20:
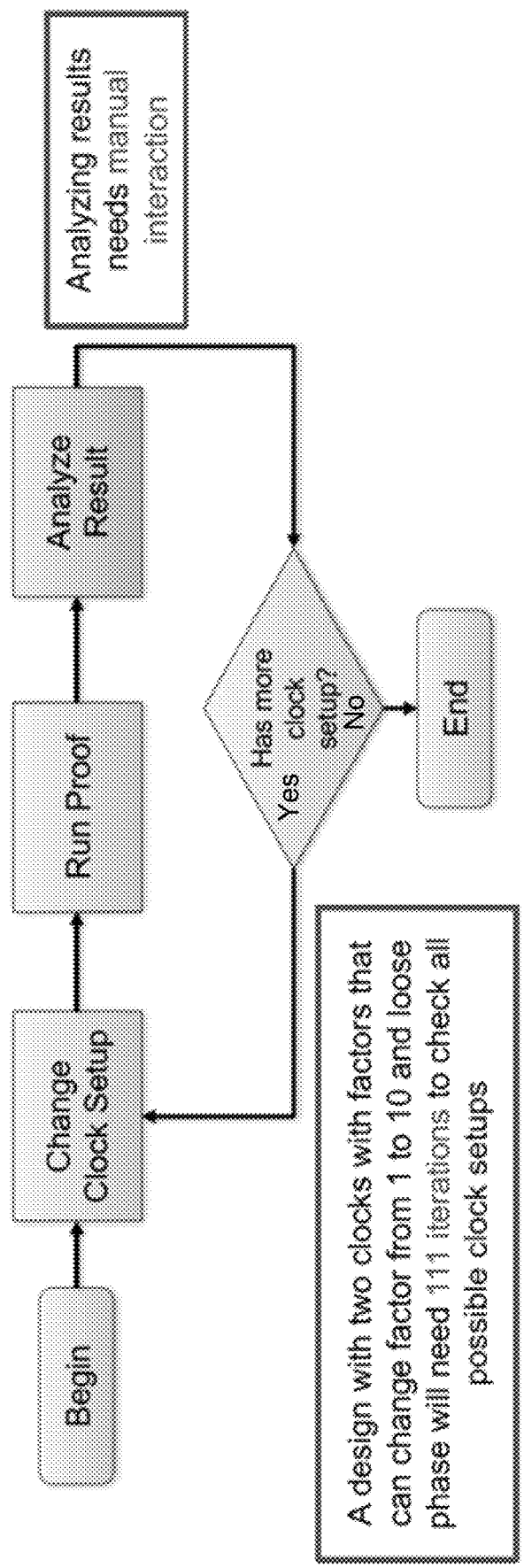
FIG. 20 is a diagram depicting an embodiment in accordance with the present disclosure.

Referring now to FIGS. 18-20, flowcharts consistent with range-based clocking process 10 are provided. As is shown in FIG. 19, the engine may select the clock factor and the clock phase as discussed above.

Figure 22:
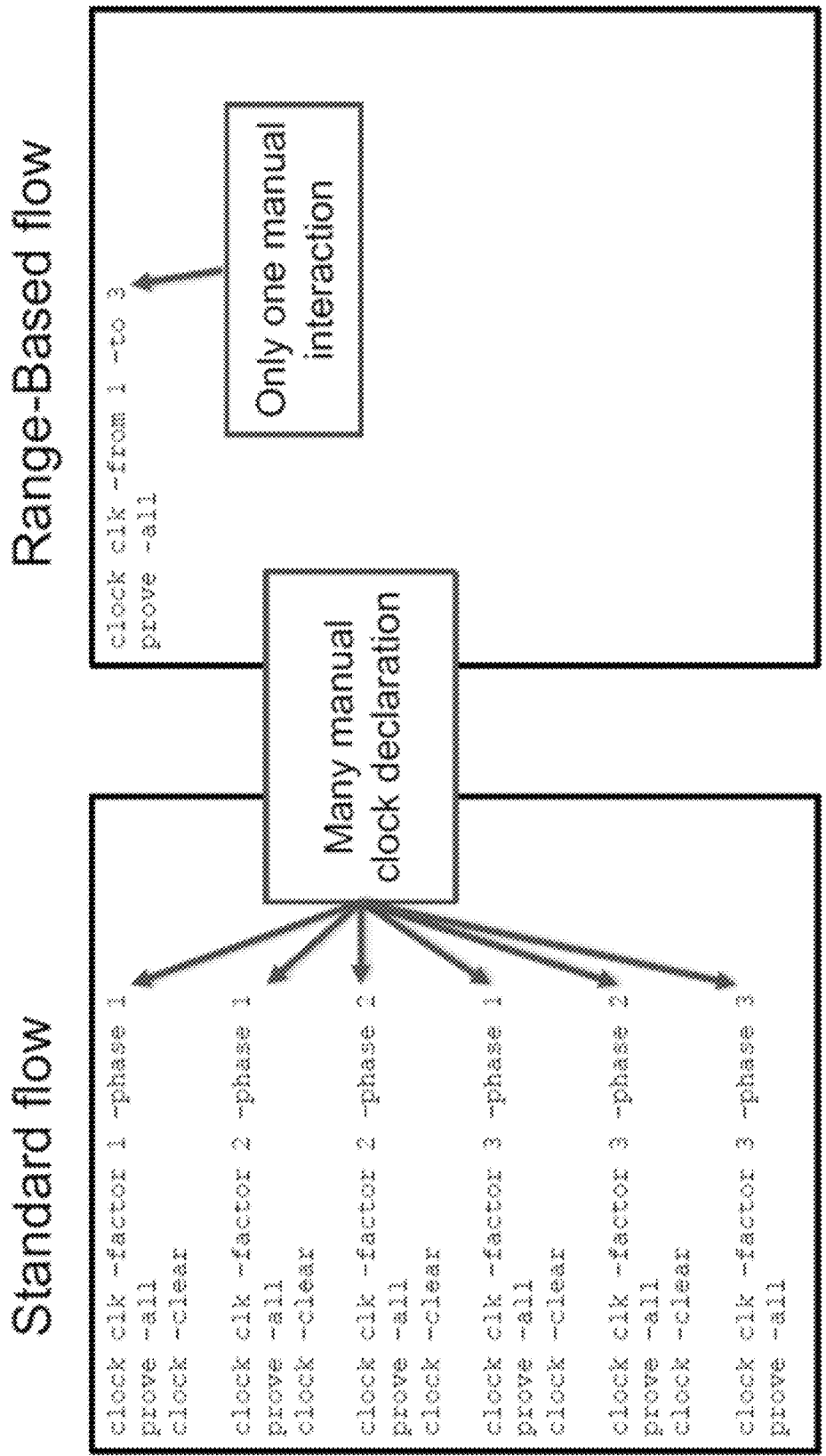
FIG. 22 is a diagram depicting an embodiment in accordance with the present disclosure.

Accordingly, embodiments of range-based clocking process 10 may provide numerous advantages over previous approaches. Embodiments included herein may leverage non-deterministic constants for the clock factor value allowing freedom for the formal engine to pick any of the valid clock configurations (and as result all valid configurations are considered by formal analysis). Range-based clocking process 10 may allow for the easy creation of a set of clock configurations and may also reduce the amount of spurious counter-examples. Additionally there is no need for excessive manual interaction as shown in FIG. 20. Embodiments included herein may also improve formal verification of designs that works with multiple clock configurations and verify multiple clock setups without changing the standard verification flow. Examples comparing the standard design flow are shown in FIGS. 21-22.

As discussed above, embodiments of range-based clocking process 10 may allow for clock modeling wherein the formal engine may have the freedom to pick the frequency of the target clock, from any of the frequencies satisfying a set of clock factors specified by user. The process may include the use of a non-deterministic constant clock factor value (referred to above as 'N') that may reflect the frequency of the clock. In some embodiments, N may be constant so the clock frequency may not change throughout the formal analysis. However, it should be noted that N may be allowed to take any of the valid clock factor values (e.g., as specified by a user), and as result, all valid frequencies may be considered by formal analysis for the target clock. In some embodiments, the target clock signal may be modeled such that it changes its value every N cycles (e.g., with respect to the internal fastest clock) and not otherwise.

In some embodiments, the target clock signal may be modeled such that the first edge (change of value) may be allowed to happen at any of the first N cycles (e.g., with respect to the internal fastest clock), allowing freedom for the formal engine to pick the phase of the target clock. As a result, all valid clock phases may be considered by formal analysis for the target clock.

In some embodiments, multiple clocks may be modeled using the above approach. As a result, all possible frequency/phase differences between modeled clocks are considered in this case.

It should be noted that although the examples included herein focus upon a ring counter any standard counter may be used to model the non-deterministic clock factor. For example, the modeling described above may be implemented using a counter and constraints. This counter may be incremented if the clock signal value is stable with respect to the internal fastest clock, and reset to 0 whenever the clock signal value changes. The target clock signal may be constrained such that it may only change its value when the counter reaches value of N (e.g., non-deterministic constant clock factor reflecting frequency). The formal engine may select any value between 0 and N to be the initial value of the counter (reflecting to the clock phase).

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for formal verification of an electronic design comprising:
   receiving, using a processor, an electronic design having a plurality of clock configurations associated therewith;
   identifying a target clock configuration associated with the electronic design;
   receiving a range of clock factor values from a user, wherein each clock factor value corresponds to a frequency of the target clock configuration;
   selecting, via a formal engine, at least one clock factor value from the range;
   selecting, via the formal engine, at least one clock phase associated with the target clock configuration;
   identifying an internal fastest clock;
   changing the at least one clock factor value based upon, at least in part, a cycle associated with the internal fastest clock; and
   performing formal verification of the electronic design, based upon, at least in part, the at least one clock factor value or the at least one clock phase.

2. The computer-implemented method of claim 1, wherein the clock factor value is associated with a non-deterministic constant.

3. The computer-implemented method of claim 1, wherein the formal engine is configured to consider all valid clock factor values during formal verification.

4. The computer-implemented method of claim 1, wherein the formal engine is configured to consider all valid clock phases during formal verification.

5. The computer-implemented method of claim 1, wherein selecting, via a formal engine, at least one clock factor value is performed using a multiplexer in communication with a ring counter.

6. The computer-implemented method of claim 1, wherein selecting, via the formal engine, at least one clock phase is performed using a multiplexer in communication with a ring counter.

7. A computer-readable storage medium for debugging in electronic design verification, the computer-readable storage medium having stored thereon instructions that when executed by a machine result in one or more operations, the operations comprising:
   receiving, using a processor, an electronic design having a plurality of clock configurations associated therewith;
   identifying a target clock configuration associated with the electronic design;
   receiving a range of clock factor values from a user, wherein each clock factor value corresponds to a frequency of the target clock configuration;
   selecting, via a formal engine, at least one clock factor value from the range;
   selecting, via the formal engine, at least one clock phase associated with the target clock configuration;
   identifying an internal fastest clock;
   changing the at least one clock factor value based upon, at least in part, a cycle associated with the internal fastest clock; and
   performing formal verification of the electronic design, based upon, at least in part, the at least one clock factor value or the at least one clock phase.

8. The computer-readable storage medium of claim 7, wherein the clock factor value is associated with a non-deterministic constant.

9. The computer-readable storage medium of claim 7, wherein the formal engine is configured to consider all valid clock factor values during formal verification.

10. The computer-readable storage medium of claim 7, wherein the formal engine is configured to consider all valid clock phases during formal verification.

11. The computer-readable storage medium of claim 7, wherein selecting, via a formal engine, at least one clock factor value is performed using a multiplexer in communication with a ring counter.

12. The computer-readable storage medium of claim 7, wherein selecting, via the formal engine, at least one clock phase is performed using a multiplexer in communication with a ring counter.

13. A system for debugging associated with formal verification of an electronic design comprising:
   a computing device having at least one processor configured to receive an electronic design having a plurality of clock configurations associated therewith, the at least one processor further configured to identify a target clock configuration associated with the electronic design, the at least one processor further configured to receive a range of clock factor values from a user, wherein each clock factor value corresponds to a frequency of the target clock configuration, the at least one processor further configured to select, via a formal engine, at least one clock factor value from the range, the at least one processor further configured to select, via the formal engine, at least one clock phase associated with the target clock configuration, the at least one processor further configured to identify an internal fastest clock and change the at least one clock factor value based upon, at least in part, a cycle associated with the internal fastest clock, the at least one processor further configured to perform formal verification of the electronic design, based upon, at least in part, the at least one clock factor value or the at least one clock phase.

14. The system of claim 13, wherein the clock factor value is associated with a non-deterministic constant.

15. The system of claim 13, wherein the formal engine is configured to consider all valid clock factor values during formal verification.

16. The system of claim 13, wherein the formal engine is configured to consider all valid clock phases during formal verification.

17. The system of claim 13, wherein selecting, via a formal engine, at least one clock factor value is performed using a multiplexer in communication with a ring counter.

* * * * *